United States Patent [19]

Tsuda et al.

[11] Patent Number: 5,075,363
[45] Date of Patent: Dec. 24, 1991

[54] MATTE THERMOPLASTIC RESIN COMPOSITION

[75] Inventors: Yusuke Tsuda, Yokkaichi; Kengi Tagami, Suzuka; Kazuyoshi Nakazawa, Yokkaichi; Yuji Yamamoto, Suzuka, all of Japan

[73] Assignee: Japan Synthetic Rubber Company, Ltd., Tokyo, Japan

[21] Appl. No.: 266,572

[22] Filed: Nov. 3, 1988

[30] Foreign Application Priority Data

Nov. 6, 1987 [JP] Japan ................... 62-280437

[51] Int. Cl.$^5$ ............. C08K 5/06; C08K 5/09; C08K 5/41; C08L 51/04
[52] U.S. Cl. ................... 524/156; 524/157; 524/167; 524/284; 524/366; 524/369; 525/71
[58] Field of Search .............. 525/71; 524/156, 157, 524/167, 284, 366, 369

[56] References Cited

U.S. PATENT DOCUMENTS 4,652,614  3/1987  Eichenauer et al. ............. 525/71

FOREIGN PATENT DOCUMENTS 154244   4/1991  European Pat. Off. .
60-44517 3/1985  Japan .
60-197713 10/1985 Japan .

*Primary Examiner*—Jacob Ziegler
*Attorney, Agent, or Firm*—Oblon, Spivak, McClelland, Maier & Neustadt

[57] ABSTRACT

A matte thermoplastic resin composition consisting essentially of:
(A) 70–97% by weight of a rubber-modified alkenyl aromatic thermoplastic resin and
(B) 30–3% by weight of a graft copolymer as a high polymer modifier for matting, obtained by polymerizting an ethylenically unsaturated carboxylic acid and at least one monomer selected from the group consisting of an alkenyl aromatic compound, an alkenyl cyanide compound and other copolymerizable alkenyl monomer in the presence of a rubbery polymer latex, wherein the content of the ethylenically unsaturated carboxylic acid component in the graft copolymer (B) is 1–30% by weight and the content of the rubbery polymer in the graft copolymer (B) is 10–60% by weight. Said composition has an excellent matte effect especially when the rubbery polymer latex gives a percentage coagulation of 20% by weight or less based on the total solids of the latex when 15% by weight, based on the total solids, of methacrylic acid is added to the latex.

19 Claims, No Drawings

MATTE THERMOPLASTIC RESIN COMPOSITION

This invention relates to a rubber-modified thermoplastic resin composition having excellent mechanical properties and excellent moldability and capable of providing molded article with a matte surface.

Rubber-modified thermoplastic resin are used in various applications because of their excellent impact resistance and moldability and good surface gloss. Depending upon the applications, their molded articles are required to have a matte surface without deteriorating other properties.

The applications requiring such a matte surface include, for example, interior parts of automobile and parts of electric appliances and equipment for office and home uses.

The matting of molded articles has heretofore been achieved by:

(1) the addition of an oxide or carbonate of titanium, magnesium, calcium or the like to a rubber-reinforced resin, (2) the addition of a rubbery elastomer to a rubber-reinforced resin, or (3) the addition of a resin component modified so as to have a three-dimensional network with a crosslinkable monomer.

These conventional matting method have various problems. For example, the method (1) substantially reduces the mechanical properties, particularly the impact resistance of a resin to be matted. Moreover, the gloss of surface of the molded article is reduced, but the gloss becomes nonuniform. The method (2) deteriorates the mechanical properties, particularly the hardness and stiffness of a resin to be matted. Further, the molded article has, on the surface, substances which look like impurities, thus greatly reduces the commercial value of the molded article. In the method (3), the matted resin is inferior in moldability and impact strength and the gloss of surface of the molded article becomes nonuniform.

Matte resins are disclosed in Japanese Patent Application Kokai (Laid-Open) Nos. 44,517/85 and 197,713/85. These resins are a blend of a rubber-modified vinyl aromatic copolymer with a copolymer of a monomer mixture of an ethylenically unsaturated carboxylic acid, a vinyl aromatic compound and a vinyl cyanide compound (Kokai No. 44,517/85) and a graft copolymer alone obtained by graft-polymerizing said monomer mixture onto a rubber (Kokai No. 197,713/85). These resins have no sufficient mechanical properties, especially no sufficient impact resistance, and the molded articles thereof have no sufficiently matte surface.

The present inventors have made extensive research in order to solve the above problems of the prior art and, as a result, have found that a matte thermoplastic resin composition having excellent mattability, uniform gloss, excellent moldability and excellent impact resistance can be obtained by mixing, at specific proportions, a rubber-modified alkenyl aromatic thermoplastic resin and a high polymer modifier for matting obtained by polymerizing a monomer mixture comprising an ethylenically unsaturated carboxylic acid in the presence of a rubbery polymer latex which is stable to said ethylenically unsaturated carboxylic acid.

According to this invention, there is provided a matte thermoplastic resin composition consisting essentially of:

(A) 70–97% by weight of a rubber-modified alkenyl aromatic thermoplastic resin and (B) 30–3% by weight of a graft copolymer as a high polymer modifier for matting, obtained by polymerizing an ethylenically unsaturated carboxylic acid and at least one monomer selected from the group consisting of an alkenyl aromatic compound, an alkenyl cyanide compound and other copolymerizable alkenyl monomer in the presence of a rubbery polymer latex, wherein the content of the ethylenically unsaturated carboxylic acid component in the high polymer modifier (B) is 1–30% by weight and the content of the rubbery polymer in the high polymer modifier (B) is 10–60% by weight.

This invention is described in more detail below.

(A) Rubber-modified alkenyl aromatic thermoplastic resin

The rubber-modified alkenyl aromatic thermoplastic resin [the component (A)] used in this invention is (1) a rubber-modified alkenyl aromatic polymer or (2) a mixture of a rubber-modified alkenyl aromatic polymer with an alkenyl aromatic polymer (not modified with any rubber).

In (1) and (2), a rubbery polymer is mixed with an alkenyl aromatic polymer in order to obtain high impact resistance. The mixture can be obtained according to a simple mechanical blending method, but in order to obtain good compatibility, the mixture is obtained according to a so-called graft copolymerization method comprising copolymerizing an alkenyl aromatic monomer, etc. in the presence of a rubbery polymer, and this method is more preferable. It is also preferable to obtain a mixture according to a so-called graft-blending method comprising mixing a rubber-modified alkenyl aromatic polymer (a graft copolymer) obtained according to said graft copolymerizing method, with an alkenyl aromatic polymer obtained separately.

The rubbery polymer includes a polybutadiene, a polyisoprene, a styrene-butadiene copolymer, an acrylic copolymer, an ethylene-propylenecopolymer, a chlorinated polyethylene, a polyurethane, etc. Of these, a polybutadiene is preferred.

The content of the rubbery polymer in the component (A) is preferably 5–40% by weight, more preferably 10–30% by weight.

The alkenyl aromatic monomer includes styrene, α-methylstyrene, bromostyrene, etc. Of these, styrene and α-methylstyrene are most suitable.

If necessary, these alkenyl aromatic monomers can be copolymerized with a comonomer. Such a comonomer includes acrylonitrile, methacrylonitrile, methyl methacrylate, N-phenylmaleimide, N-cyclohexylmaleimide, etc.

When the alkenyl aromatic monomers are used alone, the component (A) is difficult to express impact resistance. Therefore, it is preferable to use acrylonitrile as a comonomer.

The thus obtained rubber-modified alkenyl aromatic thermoplastic resin includes specifically copolymer resins such as acrylonitrile-butadiene-styrene resin (ABS resin), acrylonitrile-ethylene propylene-styrene-resin (AES resin), methyl methacrylate-butadiene-styrene resin (MBS resin), acrylonitrile-butadiene-methyl methacrylate-styrene resin, acrylonitrile-n-butyl acrylate-styrene resin (AAS resin), rubber-modified polystyrene [high-impact polystyrene (HIPS)], heat-resistant rubber-modified alkenyl aromatic resin using α-methylstyrene as all or part of the alkenyl aromatic compound, and the like; resin mixtures of a polycarbonate resin with an ABS resin or an AES resin; flame-retardant composite resins obtained by adding a vinyl chloride resin to an ABS resin; flame-retardant ABS resins obtained by adding a flame-retardant to an ABS resin; etc. (These resins are all conventional resins.)

The rubber-modified alkenyl aromatic thermoplastic resin can be produced according to emulsion polymerization, solution polymerization, bulk polymerization, suspension polymerization or the like. In the polymerization, there can be used a polymerization initiator, a molecular weight modifier, an emulsifier, a dispersant, a solvent, etc. which are conventionally used in such polymerizations.

(B) High polymer modifier for matting (graft copolymer)

The high polymer modifier for matting [the component (B)] used in this invention is a graft copolymer obtained by polymerizing a monomer mixture comprising an ethylenically unsaturated carboxylic acid in the presence of a rubbery polymer latex which is stable to said ethylenically unsaturated carboxylic acid.

The rubbery polymer of the rubbery polymer latex includes a polybutadiene, a styrene-butadiene copolymer, an acrylic copolymer, an ethylene-propylene copolymer, a chlorinated polyethylene, a polyurethane, etc. Of these, a polybutadiene is preferred.

The amount of the rubbery polymer is preferably 10-60% by weight, more preferably 20-50% by weight based on the weight of the high polymer modifier for matting (the graft copolymer).

When the amount is less than 10% by weight, the resulting thermoplastic resin composition ha insufficient impact resistance. When the amount is more than 60% by weight, the composition has poor surface appearance.

The rubbery polymer latex can be produced by:

(1) finely dispersing said rubbery polymer of solid form in water using an emulsifier and, if necessary, an organic solvent in an appropriate dispersion apparatus, or (2) producing said rubbery polymer according to emulsion polymerization.

The method (2) is preferable because it is an easy method and a stable latex can be obtained.

It is preferable that the rubbery polymer latex used in this invention be stable to an ethylenically unsaturated carboxylic acid. This stability is expressed as the percentage coagulation of the aqueous dispersion of the rubbery polymer when 15% by weight of methacrylic acid is added to the aqueous dispersion. The percentage coagulation is measured as follows.

Method of Measuring Percentage Coagulation of Rubbery Polymer Latex 1.5 g of methacrylic acid is added to 10 g (as solids) of a rubbery polymer latex. The mixture is stirred for 5 minutes at room temperature. The resulting coagulum is collected by filtration using a 80-mesh wire net and then dried at 100° C. using a vacuum dryer. The dried coagulum is weighed to obtain a g.

Percentage coagulation (% by weight)=a/10×100

The rubbery polymer latex used in this invention has preferably a percentage coagulation as measured according to the above method, of 20% by weight or less, more preferably 10% by weight or less. When the rubbery polymer latex has a percentage coagulation of more than 20% by weight, the polymerization stability when the monomer mixture comprising an ethylenically unsaturated carboxylic acid is polymerized in the presence of said latex, tends to be poor, and a large amount of a coagulum is formed in some cases.

In order for the rubbery polymer latex to have a percentage coagulation of 20% by weight or less, it is important to carefully select an emulsifier in the production of the latex.

For example, when a conventionally used fatty acid type emulsifier is used, the percentage coagulation becomes far larger than 20% by weight; therefore, the use of this emulsifier is not desired. Preferable emulsifiers are anionic and nonionic emulsifiers such as salts of aliphatic alcohol sulfates (e.g. sodium laurylsulfate and the like), alkylarylsulfonic acid salts (e.g. sodium dodecylbenzenesulfonate and the like), sodium dialkylsulfosuccinates, alkyl phosphonates, sodium polyoxyethylene alkyl ether sulfates, sodium polyoxyethylene alkylphenol ether sulfates, naphthalenesulfonic acid-formalin condensate, polyoxyethylene lauryl ether, polyoxyethylene nonylphenol ether and the like; cationic emulsifiers such as laurylamine acetate, stearyltrimethylammonium chloride and the like; and combinations of these emulsifiers. Especially preferable emulsifiers are salts of aliphatic alcohol sulfates, alkylarylsulfonic acid salts and combinations thereof.

It is possible to use a mixture of a fatty acid type emulsifier and a preferable emulsifier as mentioned above, or to use a mixture of a rubbery polymer latex obtained using a fatty acid type emulsifier and a rubbery polymer latex obtained using a preferable emulsifier. In this case, however, the proportion of the fatty acid type emulsifier in all the emulsifiers used is preferably 30% by weight or less, more preferably 20% by weight or less. Examples of the fatty acid type emulsifier used are disproportionated rosin acid salts such as potassium salt of disproportionated rosin acid, sodium salt of disproportionated rosin acid and the like; and fatty acid salts such as potassium oleate, potassium laurate, sodium laurate, sodium stearate, potassium stearate and the like.

In the production of the rubbery polymer latex according to emulsion polymerization, the emulsifier used must be selected with care as mentioned above. However, the production can be effected according to a conventional method. It can be effected, for example, by placing deionized water, an emulsifier as mentioned above, monomers, a molecular weight modifier and a polymerization initiator in a pressure reactor provided with a stirrer and then subjecting them to polymerization under the conditions of 5°–150° C. (polymerization temperature), 1–70 hours (polymerization time) and 1.0–15.0 kg/cm² (polymerization pressure).

The ethylenically unsaturated carboxylic acid includes acrylic acid, methacrylic acid, itaconic acid, maleic acid, fumaric acid, etc. Acrylic acid and methacrylic acid are preferred.

The ethylenically unsaturated carboxylic acid is used in an amount of preferably 1-30% by weight, more preferably 2-20% by weight, most preferably 3-10% by weight, based on the weight of the high polymer modifier for matting (graft copolymer)- When the amount is less than 1% by weight, the matte effect of the resulting thermoplastic resin composition is insufficient. When the amount is more than 30% by weight, the impact resistance of the resin composition is low.

The comonomers other than the ethylenically unsaturated carboxylic acid are selected from the group consisting of an alkenyl aromatic compound, an alkenyl cyanide compound and other copolymerizable alkenyl monomer, and used alone or in admixture of two or more.

The alkenyl aromatic compound includes styrene, α-methylstyrene and bromostyrene. Of these, styrene and α-methylstyrene are preferred.

The alkenyl cyanide compound includes acrylonitrile and methacrylonitrile. Acrylonitrile is preferred.

Said other copolymerizable alkenyl monomer includes amido group-containing vinyl compounds such as acrylamide and the like; esters of ethylenically unsaturated carboxylic acids, such as methyl methacrylate, n-butyl acrylate and the like; maleimides such as N-phenylmaleimide; etc. Methyl methacrylate is preferred.

The ratio of these comonomers used in combination, i.e. the ratio of alkenyl aromatic compound/alkenyl cyanide compound/other copolymerizable alkenyl monomer is preferably 50-90/10-40/0-40 by weight, more preferably 60-80/20-30/0-30 by weight.

Specific examples of the combination of the monomers used in the graft copolymerization to obtain a graft copolymer are acrylic acid/styrene/acrylonitrile, methacrylic acid/styrene/acrylonitrile, methacrylic acid/styrene/acrylonitrile/α-methylstyrene, and methacrylic acid/styrene/acrylonitrile/methyl methacrylate. Of these, methacrylic acid/styrene/acrylonitrile and methacrylic acid/styrene/acrylonitrile/α-methylstyrene are preferred.

The production of the graft copolymer can be achieved by copolymerizing the monomer mixture comprising an ethylenically unsaturated carboxylic acid in the presence of the rubbery polymer latex.

In this copolymerization, a polymerization initiator and a molecular weight modifier are used. They may be those used in conventional emulsion polymerization. If necessary, an emulsifier can be used. This emulsifier is restricted to those stable to the ethylenically unsaturated carboxylic acid.

The polymerization initiator is, for example, redox type initiators which are combinations of an organic hydroperoxide (e.g. cumene hydroperoxide, diisopropylbenzene hydroperoxide, p-menthane hydroperoxide or the like) with a reducing agent recipe (e.g. sugar-containing pyrophosphoric acid recipe, sulfoxylate recipe, mixed recipe of sugar-containing pyrophosphoric acid recipe and sulfoxylate recipe); persulfates (e.g. potassium persulfate, ammonium persulfate and the like); azobisisobutyronitrile; benzoyl peroxide; lauroyl peroxide; and the like. Of these, combinations of an organic hydroperoxide with a reducing agent recipe are especially preferred.

The molecular weight modifier includes, for example, mercaptans such as octyl mercaptan, n-dodecyl mercaptan, tert-dodecyl mercaptan, n-hexadecyl mercaptan, n-tetradecyl mercaptan, tert-tetradecyl mercaptan and the like; tetraethylthiuram sulfide; carbon tetrachloride; ethylene bromide; hydrocarbons such as pentaphenylethane and the like; acrolein; methacrolein; allyl alcohol; and 2-ethylhexyl thioglycolate. These molecular weight modifiers can be used alone or in combination of two or more. The molecular weight modifier can be added at once, in portions or continuously.

The polymerization of the monomers is effected according to:

(1) a batch polymerization method,
(2) an increment polymerization method, or
(3) a method which is a combination of a batch polymerization method with an increment polymerization method.

Any of the methods can be used though the method (3) is preferred.

With respect to the polymerization conditions, the conditions ordinarily used in such a graft copolymerization can be applied. For example, the conditions may be 30°-150° C. (polymerization temperature), 1-15 hours (polymerization time) and 1.0-5.0 kg/cm² (polymerization pressure).

It is preferable to select or set the polymerization initiator, the molecular weight modifier, the method of addition of monomers, the polymerization conditions, etc. so that the resulting graft copolymer has a grafting degree as measured according to the following method, of 15-150% by weight, preferably 15-100% by weight, more preferably 20-80% by weight and the non-graft component (matrix component) has an intrinsic viscosity $[\eta]$ of 0.25-1.0 dl/g, preferably 0.4-0.8 dl/g, more preferably 0.5-0.7 dl/g.

Method of Measuring Grafting Degree

A certain amount (b g) of a graft copolymer was added to acetone. The mixture was shaked for 2 hours by a shaker to dissolve free copolymers. The mixture was then subjected to centrifugation at 23,000 rpm for 30 minutes to obtain insolubles. Then, drying was effected at 120° C. for 1 hour using a vacuum dryer to obtain insolubles (c g) and free copolymers. The grafting degree of the graft copolymer was calculated from the following equation:

$$\text{Grafting degree}(\%) = \frac{(c) - (b) \times \binom{\text{rubber weight fraction in graft copolymer}}{}}{(b) \times \binom{\text{rubber weight fraction in graft copolymer}}{}} \times 100$$

Measurement of Intrinsic Viscosity $[\eta]$

Free copolymers were isolated from a graft copolymer, dissolved in methyl ethyl ketone and measured for intrinsic viscosity at 30° C. using an Ubbelohde's viscometer.

The mixing of the rubber-modified alkenyl aromatic thermoplastic resin [the component (A)] and the high polymer modifier for matting [the component (B)] can be effected by a conventional mixing method using a mixing means (e.g. Banbury mixer, Brabender, plastomill, kneader, vented extruder or the like) which is conventionally employed in mixing thermoplastic resins. A method using a vented extruder is preferable.

The form of each component resin before mixing may be any of pellets, beads, powder, flake, etc. It is preferable that the mixing be effected ordinarily at about 200°-300° C.

The amount of the rubber-modified alkenyl aromatic thermoplastic resin [the component (A)]used is 70-97% by weight, preferably 80-95% by weight, based on the weight of the resulting composition, and the amount of the high polymer modifier for matting [the component (B)] used is 30-3% by weight, preferably 20-5% by weight, based on the weight of the composition.

When the amount of the component (A) is less than 70% by weight, in other words, the amount of the component (B) is more than 30% by weight, the impact resistance of the resulting composition is insufficient. When the amount of the component (A) is more than 97% by weight, in other words, the amount of the component (B) is less than 3% by weight, the resulting composition has sufficient impact resistance but insufficient matte effect (i.e. the composition is glossy).

In the composition, the total content of the rubbery polymers in the component (A) and the component (B) is preferably 5-35% by weight, more preferably 10-30% by weight.

In the matte thermoplastic resin composition of this invention, it is considered that the high polymer modifier for matting comprising an ethylenically unsaturated carboxylic acid as a comonomer acts as a kind of organic filler and allows the surface of the molded article produced from the resin composition to cause diffused reflection of light, resulting in disappearance of the surface gloss.

The use of such an organic filler in conventional resin compositions results in a reduction in impact resistance. In the composition of this invention, however, no such problem arises.

The reason is not clear but is presumably that the rubbery polymer contained in the high polymer modifier for matting contributes greatly to the impact resistance possessed by the composition.

The matte thermoplastic resin composition of this invention can contain, if necessary, besides the essential components (A) and (B), compounding agents and additives which are conventionally used in thermoplastic resin compositions, such as lubricant, antistatic agent, oxidation inhibitor, flame retardant, ultraviolet absorber, inhibitor for light oxidation, coloring agent, glass fiber and the like.

The composition of this invention can be used in admixture with a general-purpose thermoplastic resin such as polyethylene, polypropylene, polyvinyl chloride or the like, or with an engineering plastic such as polyamide, polyalkylene terephthalate, polycarbonate or the like.

The composition of this invention can further contain at least one monovalent-, divalent- or trivalent-metal compound as a compounding agent, whereby a molded article having a very good matte effect and a good surface appearance can be obtained.

The metal compound is a compound capable of producing a monovalent to trivalent metal ion of a metal of Groups I-V of the Periodic Table and includes hydroxides, oxides, salts, alcoholates, etc. of said metals. Examples of said metal ion are $Li^+$, $Na^+$, $K^+$, $Ca^+$, $Ag^+$, $Be^{2+}$, $Mg^{2+}$, $Ca^{2+}$, $Zn^{2+}$, $Ba^{2+}$, $Al^{3+}$, $Fe^{2+}$ and $Fe^{3+}$.

The hydroxides, oxides, salts and alcoholates include $Zn(OH)_2$, $Al(OH)_3$, $KOH$, $Ca(OH)_2$, $Sn(OH)_2$, $Fe(OH)_2$, $NaOH$, $Ba(OH)_2$, $Hg(OH)_2$, etc. as the hydroxides; $ZnO$, $Al_2O_3$, $K_2O$, $CaO$, $SnO$, $FeO$, $Na_2O$, $BaO$, $MgO$, etc. as the oxides; $ZnCl_2$, $Zn(C_2H_3O_2)_2$, $ZnSO_4$, $AlCl_3$, $Al_2(SO_4)_3$, $KCl$, $KC_2H_3O_2$, $K_2SO_4$, $CaCl_2$, $Ca(C_2H_3O_2)_2$, $CaSO_4$, $SnCl_2$, $SnSO_4$, $FeCl_2$, $Fe(C_2H_3O_2)_2$, $FeSO_4$, $NaCl$, $NaC_2H_3O_2$, $Na_2SO_4$, $BaCl_2$, $Ba(C_2H_3O_2)$, $BaSO_4$, $MgCl_2$, $Mg(C_2H_3O_2)_2$, $MgSO_4$, zinc stearate, calcium stearate, barium stearate, tin stearate, dibutyltin dilaurate, dibutyltin distearate and the like as the salts; and sodium methylate, sodium ethylate, sodium phenolate and the like.

The metal compound is preferably an oxide, especially preferably $ZnO$, $Al_2O_3$, $K_2O$, $CaO$, $SnO$, $FeO$, $Na_2O$, $BaO$ or $MgO$.

It is appropriate to use the metal compound in an amount of 0.1-2 moles, preferably 0.2-1.5 moles, per mole of the ethylenically unsaturated carboxylic acid used in the present composition.

When the amount is less than 0.1 mole, no sufficient matte effect is obtained. When the amount is more than 2.0 moles, the impact resistance of the resulting composition is low.

This invention is explained in more detail below referring to Examples, which are merely by way of illustration.

In the Examples, part is by weight unless otherwise specified.

PRODUCTION EXAMPLE 1 (RUBBERY POLYMER LATEXES R-1 to R-6)

In a stainless steel polymerization reactor having an internal volume of 100 liters provided with 4-stage paddles, a polymerization reaction was carried out using a recipe as shown in Table 1. The contents in the reactor were heated with stirring by the rotation of the paddles at 90 rpm; when the temperature of the contents reached 50° C., potassium persulfate was added, after which the reaction temperature was controlled at 50° C.; when the conversion reached 90%, 0.1 part by weight of diethylhydroxylamine was added to terminate the reaction. The reaction mixture was subjected to steam distillation to substantially remove the unreacted monomers, whereby a rubbery substance latex was obtained.

The latex was measured for average particle diameter using Coulter Nanosizer (product of Nihon Kagaku Kikai K. K.).

TABLE 1

|  |  | R-1 | R-2 | R-3 | R-4 | R-5 | R-6 |
|---|---|---|---|---|---|---|---|
| 1,3-Butadiene | Parts | 100 | 75 | 20 | 100 | 100 | 100 |
| Styrene | Parts | 0 | 25 | 0 | 0 | 0 | 0 |
| n-Butyl acrylate | Parts | 0 | 0 | 80 | 0 | 0 | 0 |
| Sodium dodecylbenzenesulfonate | Parts | 1.5 | 1.5 | 1.5 | 0 | 0 | 1.35 |
| Disproportionated potassium rosinate | Parts | 0 | 0 | 0 | 1.5 | 0 | 0.15 |
| Potassium chloride | Parts | 1.0 | 1.0 | 1.5 | 1.0 | 1.0 | 1.0 |
| Sodium laurylsulfate | Parts | 0 | 0 | 0 | 0 | 1.5 | 0 |
| Potassium hydroxide | Parts | 0.12 | 0.12 | 0.12 | 0.12 | 0.1 | 0.1 |
| Potassium persulfate | Parts | 0.25 | 0.25 | 0.25 | 0.25 | 0.25 | 0.25 |
| Deionized water | Parts | 100 | 100 | 100 | 100 | 100 | 100 |
| Polymerization temperature | °C. | 50 | 50 | 50 | 50 | 50 | 50 |
| Polymerization time | hrs | 50 | 45 | 30 | 30 | 30 | 35 |
| Conversion | % | 88 | 90 | 90 | 90 | 89 | 90 |
| Average particle diameter | Å | 1500 | 1450 | 2000 | 1700 | 1800 | 1700 |

The rubbery polymer latexes obtained in Production Example 1 and their mixtures were measured for percentage coagulation by adding methacrylic acid, according to the previously mentioned method. The results obtained are shown in Table 2.

Thereafter, the reaction mixture was subjected to a further reaction while continuously adding thereto 50 parts of deionized water, 1 part of sodium dodecylbenzenesulfate, 0.02 part of potassium hydroxide, 0.1 part of tert-dodecyl mercaptan, 0.2 part of diisopropylben-

TABLE 2

| Rubbery polymer | Emulsifier (parts) | Percentage coagulation of rubbery polymer latex when methacrylic acid is added Measured samples (unit: parts) | | | | | | | | |
|---|---|---|---|---|---|---|---|---|---|---|
| | | 1 | 2 | 3 | 4 | 5 | 6 | 7 | 8 | 9 |
| R-1 | Sodium dodecylbenzenesulfonate (1.5) | 100 | 0 | 0 | 0 | 0 | 0 | 90 | 80 | 65 |
| R-2 | Sodium dodecylbenzenesulfonate (1.5) | 0 | 100 | 0 | 0 | 0 | 0 | 0 | 0 | 0 |
| R-3 | Sodium dodecylbenzenesulfonate (1.5) | 0 | 0 | 100 | 0 | 0 | 0 | 0 | 0 | 0 |
| R-4 | Disproportionated potassium rosinate (1.5) | 0 | 0 | 0 | 100 | 0 | 0 | 10 | 20 | 35 |
| R-5 | Sodium laurylsulfate (1.5) | 0 | 0 | 0 | 0 | 100 | 0 | 0 | 0 | 0 |
| R-6 | Sodium dodecylbenzenesulfonate (1.35) Disproportionated potassium rosinate (0.15) | 0 | 0 | 0 | 0 | 0 | 100 | 0 | 0 | 0 |
| | Fraction of fatty acid type emulsifier in all emulsifiers (% by weight) | 0 | 0 | 0 | 100 | 0 | 10 | 10 | 20 | 35 |
| | Percentage coagulation (% by weight) | 6 | 6 | 5 | 90 | 7 | 8 | 8 | 12 | 25 |

As is clear from Table 2, the percentage coagulation is below 10% by weight when an alkylarylsulfonic acid salt or a sulfonic acid ester salt of aliphatic alcohol is used; however, the percentage coagulation exceeds 20% by weight when a fatty acid type emulsifier is used or the content of a fatty acid type emulsifier in all emulsifiers exceeds 30% by weight.

PRODUCTION EXAMPLE 2 (GRAFT POLYMERS G-1 to G-22)

In a 7-liter glass flask provided with an agitating element were placed 100 parts of deionized water, 0.5 part of sodium dodecylbenzenesulfate, 0.01 part of potassium hydroxide, 0.1 part of tert-dodecyl mercaptan, one (or two) of the rubbery polymer latexes (R-1 to R-6) obtained in Production Example 1, in a proportion as shown in Table 3, and various monomers in proportions as shown in Table 3. The mixture was heated with stirring. When the temperature of the mixture reached 45° C., there were added an aqueous activator solution consisting of 0.1 part of sodium ethylenediaminetetraacetate, 0.003 part of ferrous sulfate, 0.2 part of formaldehyde sodium sulfoxylate dihydrate and 15 parts of deionized water, and 0.1 part of diisopropylbenzene hydroperoxide. Then, the reaction was carried out at 70° C. for 1 hour (former stage polymerization).

zene hydroperoxide and a mixture of various monomers in proportions as shown in Table 3, at 70° C. for 3 hours (latter stage polymerization).

After the completion of the addition, the reaction was continued for 1 hour with stirring. Then, 0.2 part of 2,2-methylene-bis(4-ethyl-6-tert-butylphenol) was added and the reaction mixture was taken out of the flask.

The reaction product was coagulated with 2 parts of potassium chloride, dehydrated, water-washed and dried to recover a graft copolymer resin in the powder form.

The conversion as well as the grafting degree and intrinsic viscosity $[\eta]$ as measured according to the previously mentioned methods are shown in Table 3.

The percentage coagulation of the used rubbery polymer latex when methacrylic acid was added is also shown in Table 3. As is clear from Table 3, the polymerization stability is very low when the percentage coagulation is more than 20% by weight (G-8 and G-11). Incidentally, the polymerization stability was evaluated according to the following criterion:

o: The amount of the coagulum formed during polymerization is small and the polymerization can be carried out stably.

x: The amount of the coagulum formed during polymerization is large and the polymerization is substantially difficult to carry out.

TABLE 3

| | | G-1 | G-2 | G-3 | G-4 | G-5 | G-6 | G-7 | G-8 | G-9 | G-10 | G-11 |
|---|---|---|---|---|---|---|---|---|---|---|---|---|
| Batch polymerization | | | | | | | | | | | | |
| Rubbery polymer | Type | R-1 | R-1 | R-1 | R-1 | R-2 | R-3 | — | R-4 | R-5 | R-6 | R-1/R-4 |
| | Parts | 40 | 40 | 20 | 40 | 40 | 40 | 0 | 40 | 40 | 40 | 26/14 |
| Styrene | Parts | 9.4 | 13.5 | 18 | 13.5 | 13.5 | 13.5 | 23.5 | 13.5 | 13.5 | 13.5 | 13.5 |
| Acrylonitrile | Parts | 3.6 | 4.5 | 6 | 4.5 | 4.5 | 4.5 | 7.8 | 4.5 | 4.5 | 4.5 | 4.5 |
| α-Methylstyrene | Parts | 5 | 0 | 0 | 0 | 0 | 0 | 0 | 0 | 0 | 0 | 0 |
| Methyl methacrylate | Parts | 0 | 0 | 0 | 0 | 0 | 0 | 0 | 0 | 0 | 0 | 0 |
| Methacrylic acid | Parts | 2 | 2 | 3 | 0 | 2 | 2 | 2 | 2 | 2 | 2 | 2 |
| Acrylic acid | Parts | 0 | 0 | 0 | 2 | 0 | 0 | 0 | 0 | 0 | 0 | 0 |
| Increment polymerization | | | | | | | | | | | | |
| Styrene | Parts | 18.8 | 27 | 36 | 27 | 27 | 27 | 47 | 27 | 27 | 27 | 27 |

TABLE 3-continued

| | | | | | | | | | | | | |
|---|---|---|---|---|---|---|---|---|---|---|---|---|
| Acrylonitrile | Parts | 7.2 | 9 | 12 | 9 | 9 | 9 | 15.7 | 9 | 9 | 9 | 9 |
| α-Methylstyrene | Parts | 10 | 0 | 0 | 0 | 0 | 0 | 0 | 0 | 0 | 0 | 0 |
| Methyl methacrylate | Parts | 0 | 0 | 0 | 0 | 0 | 0 | 0 | 0 | 0 | 0 | 0 |
| Methacrylic acid | Parts | 4 | 4 | 5 | 0 | 4 | 4 | 4 | 4 | 4 | 4 | 4 |
| Acrylic acid | Parts | 0 | 0 | 0 | 4 | 0 | 0 | 0 | 0 | 0 | 0 | 0 |
| Content of ethylenically unsaturated carboxylic acid in graft polymer | % by weight | 6 | 6 | 8 | 6 | 6 | 6 | 6 | 6 | 6 | 6 | 6 |
| Polymerization stability | ○, x | ○ | ○ | ○ | ○ | ○ | ○ | ○ | x | ○ | ○ | x |
| Conversion | % | 91 | 92 | 92 | 90 | 91 | 91 | 90 | — | 90 | 89 | — |
| Grafting degree | % | 90 | 80 | 60 | 75 | 85 | 40 | — | — | 75 | 75 | — |
| [η] | dl/g | 0.49 | 0.57 | 0.55 | 0.56 | 0.55 | 0.50 | 0.6 | — | 0.54 | 0.55 | — |
| Percentage coagulation of rubbery polymer latex when methacrylic acid is added | % by weight | 6 | 6 | 6 | 6 | 6 | 5 | — | 90 | 7 | 8 | 25 |

| | | G-12 | G-13 | G-14 | G-15 | G-16 | G-17 | G-18 | G-19 | G-20 | G-21 | G-22 |
|---|---|---|---|---|---|---|---|---|---|---|---|---|
| Batch polymerization | | | | | | | | | | | | |
| Rubbery polymer | Type | R-1 | R-1 | R-1 | R-1 | R-1 | R-1 | R-1 | R-1 | R-1 | R-1 | R-1 |
| | Parts | 40 | 40 | 40 | 40 | 40 | 40 | 15 | 30 | 50 | 5 | 65 |
| Styrene | Parts | 11.3 | 9 | 6.8 | 14.6 | 14.8 | 11.5 | 19.7 | 16.0 | 11.0 | 22.3 | 7.3 |
| Acrylonitrile | Parts | 3.7 | 3 | 2.2 | 4.8 | 4.9 | 4.5 | 6.6 | 5.3 | 3.7 | 7.4 | 2.4 |
| α-Methylstyrene | Parts | 0 | 0 | 0 | 0 | 0 | 0 | 0 | 0 | 0 | 0 | 0 |
| Methyl methacrylate | Parts | 0 | 0 | 0 | 0 | 0 | 2 | 0 | 0 | 0 | 0 | 0 |
| Methacrylic acid | Parts | 5 | 8 | 11 | 0.6 | 0.3 | 2 | 2 | 2 | 2 | 2 | 2 |
| Acrylic acid | Parts | 0 | 0 | 0 | 0 | 0 | 0 | 0 | 0 | 0 | 0 | 0 |
| Increment polymerization | | | | | | | | | | | | |
| Styrene | Parts | 22.5 | 18 | 13.5 | 29.1 | 29.6 | 23 | 39.5 | 32.0 | 22.0 | 44.5 | 14.5 |
| Acrylonitrile | Parts | 7.5 | 6 | 4.5 | 9.7 | 9.8 | 9 | 13.2 | 10.7 | 7.3 | 14.8 | 4.8 |
| α-Methylstyrene | Parts | 0 | 0 | 0 | 0 | 0 | 0 | 0 | 0 | 0 | 0 | 0 |
| Methyl methacrylate | Parts | 0 | 0 | 0 | 0 | 0 | 4 | 0 | 0 | 0 | 0 | 0 |
| Methacrylic acid | Parts | 10 | 16 | 22 | 1.2 | 0.6 | 4 | 4 | 4 | 4 | 4 | 4 |
| Acrylic acid | Parts | 0 | 0 | 0 | 0 | 0 | 0 | 0 | 0 | 0 | 0 | 0 |
| Content of ethylenically unsaturated carboxylic acid in graft polymer | % by weight | 15 | 24 | 33 | 1.8 | 0.9 | 6 | 6 | 6 | 6 | 6 | 6 |
| Polymerization stability | ○, x | ○ | ○ | ○ | ○ | ○ | ○ | ○ | ○ | ○ | ○ | ○ |
| Conversion | % | 88 | 89 | 87 | 90 | 91 | 91 | 92 | 90 | 90 | 94 | 89 |
| Grafting degree | % | 70 | 72 | 60 | 70 | 73 | 65 | 55 | 70 | 80 | 50 | 80 |
| [η] | dl/g | 0.56 | 0.57 | 0.57 | 0.55 | 0.57 | 0.48 | 0.54 | 0.55 | 0.52 | 0.52 | 0.48 |
| Percentage coagulation of rubbery polymer latex when methacrylic acid is added | % by weight | 6 | 6 | 6 | 6 | 6 | 6 | 6 | 6 | 6 | 6 | 6 |

EXAMPLES 1-16 AND COMPARATIVE EXAMPLE 1

The Graft Polymers G-1 to G-6, G-9, G-10, G-12 to G-17 [the polymeric modifiers (B) for matting] obtained in Production Example 2 were mixed with various rubber-modified alkenyl aromatic thermoplastic resins (A) in proportions as shown in Table 4. Each mixture was passed through a 30-mm twin-screw vented extruder at 220°-250° C. to obtain pellets. The pellets were dried and then subjected to injection molding to obtain a molded article. The molded article was measured for properties to obtain results as shown in Table 4.

The composition of each resin shown in Table 4 is as follows:

ABS Resin-1: An ABS resin consisting of 20 parts of a polybutadiene rubber, 54 parts of styrene and 26 parts of acrylonitrile.

ABS Resin-2: An ABS resin consisting of 15 parts of a polybutadiene rubber, 10 parts of styrene, 50 parts of α-methylstyrene and 20 parts of acrylonitrile ABS Resin-3: An ABS resin consisting of 26 parts of a polybutadiene rubber, 50 parts of styrene and 24 parts of acrylonitrile AES Resin An AES resin consisting of 30 parts of an EPT (JSR EP-24, product of Japan Synthetic Rubber Co., Ltd.), 50 parts of styrene and 20 parts of acrylonitrile AAS resin: An AAS resin consisting of 25 parts of a n-butyl acrylate polymer, 50 parts of styrene and 25 parts of acrylonitrile AS Resin JSR AS 230 (product of Japan Synthetic Rubber Co., Ltd.)

Polycarbonate resin: NOVAREX 7022 (product of Mitsubishi Chemical Industries, Ltd.)

The measurements of properties were made according to the following methods:

Impact strength: ASTM D 256-54T Izod, notched, 23° C.

Surface gloss: Reflected light at an incident angle of 60° was measured using a digital variable gloss meter (UGV-4D, product of Suga Shikenki K. K.)

Surface appearance: A molded article of 150 mm × 150 mm × 30 mm (thickness) was made using an 8-ounce injection molding machine. The surface appearance of the article was evaluated visually. ○ shows a surface of uniform gloss, and x shows a surface of nonuniform gloss and severe roughness.

TABLE 4

| Example | Example | Example | Example | Example | Example | Example | Example | Example |
|---|---|---|---|---|---|---|---|---|

TABLE 4-continued

|  | 1 | 2 | 3 | 4 | 5 | 6 | 7 | 8 | 9 |
|---|---|---|---|---|---|---|---|---|---|
| (A) Rubber-modified alkenyl aromatic thermpoplastic resin (parts) | | | | | | | | | |
| ABS Resin-1 | 80 | 80 | 80 | 80 | 80 | 80 | 0 | 0 | 0 |
| ABS Resin-2 | 0 | 0 | 0 | 0 | 0 | 0 | 80 | 0 | 0 |
| AES Resin | 0 | 0 | 0 | 0 | 0 | 0 | 0 | 90 | 0 |
| AAS Resin | 0 | 0 | 0 | 0 | 0 | 0 | 0 | 0 | 90 |
| AS Resin | 10 | 10 | 10 | 10 | 10 | 10 | 10 | 0 | 0 |
| Polycarbonate resin | 0 | 0 | 0 | 0 | 0 | 0 | 0 | 0 | 0 |
| (B) High polymer modifier for matting | | | | | | | | | |
| Type | G-1 | G-2 | G-3 | G-4 | G-5 | G-6 | G-2 | G-6 | G-6 |
| Parts | 10 | 10 | 10 | 10 | 10 | 10 | 10 | 10 | 10 |
| Content of ethylenically unsaturated carboxylic acid in high polymer modifier for matting (% by weight) | 6 | 6 | 8 | 6 | 6 | 6 | 6 | 6 | 6 |
| Impact strength (kg · cm/cm) | 30 | 39 | 38 | 38 | 35 | 32 | 22 | 33 | 15 |
| Surface gloss (%) | 25 | 24 | 19 | 19 | 20 | 25 | 18 | 22 | 20 |
| Surface appearance | ○ | ○ | ○ | ○ | ○ | ○ | ○ | ○ | ○ |

|  | Example 10 | Example 11 | Example 12 | Example 13 | Comparative Example 1 | Example 14 | Example 15 | Example 16 | Comparative Example 2 |
|---|---|---|---|---|---|---|---|---|---|
| (A) Rubber-modified alkenyl aromatic thermpoplastic resin (parts) | | | | | | | | | |
| ABS Resin-1 | 45 | 80 | 80 | 80 | 80 | 80 | 80 | 80 | 80 |
| ABS Resin-2 | 0 | 0 | 0 | 0 | 0 | 0 | 0 | 0 | 0 |
| AES Resin | 0 | 0 | 0 | 0 | 0 | 0 | 0 | 0 | 0 |
| AAS Resin | 0 | 0 | 0 | 0 | 0 | 0 | 0 | 0 | 0 |
| AS Resin | 0 | 10 | 10 | 10 | 10 | 10 | 10 | 10 | 10 |
| Polycarbonate resin | 45 | 0 | 0 | 0 | 0 | 0 | 0 | 0 | 0 |
| (B) High polymer modifier for matting | | | | | | | | | |
| Type | G-2 | G-9 | G-10 | G-17 | G-16 | G-15 | G-12 | G-13 | G-14 |
| Parts | 10 | 10 | 10 | 10 | 10 | 10 | 10 | 10 | 10 |
| Content of ethylenically unsaturated carboxylic acid in high polymer modifier for matting (% by weight) | 6 | 6 | 6 | 6 | 0.9 | 1.8 | 15 | 24 | 33 |
| Impact strength (kg · cm/cm) | 45 | 38 | 37 | 33 | 42 | 40 | 28 | 27 | 17 |
| Surface gloss (%) | 23 | 25 | 25 | 22 | 67 | 32 | 23 | 24 | 20 |
| Surface appearance | ○ | ○ | ○ | ○ | x | ○ | ○ | ○ | x |

As is clear from Table 4, the matte resin compositions obtained according to this invention have good impact resistance, and are excellent in matte state and surface appearance.

EXAMPLES 17-22 AND COMPARATIVE EXAMPLES 3-5

The preparation and property measurement of each resin composition were made in the same manners as in Examples 1-16. The results are shown in Table 5.

Examples 17 and 18 and Comparative Examples 3 and 4 are cases for showing an effect of the change in the mixing ratio of the rubber-modified alkenyl aromatic thermoplastic resin [the component (A)]and the high polymer modifier for matting [the component (B)].

Examples 19 and Comparative Example 5 are cases for showing an effect of the high polymer modifier for matting [the component (B)].

Examples 21 and 22 are cases where a metal compound was added in compounds a matte thermoplastic resin composition of this invention and the resulting composition wa molded and measured for properties.

TABLE 5

|  | Example 17 | Example 18 | Comparative Example 3 | Comparative Example 4 | Example 19 | Comparative Example 5 | Example 20 | Example 21 | Example 22 |
|---|---|---|---|---|---|---|---|---|---|
| (A) Rubber-modified alkenyl aromatic thermoplastic resin (parts) | | | | | | | | | |
| ABS Resin-1 | 80 | 72 | 80 | 68 | 0 | 0 | 80 | 80 | 80 |
| ABS Resin-2 | 0 | 0 | 0 | 0 | 62 | 77 | 0 | 0 | 0 |
| AS Resin | 14 | 8 | 18 | 0 | 28 | 13 | 14 | 14 | 14 |
| (B) High polymer modifier for matting | | | | | | | | | |
| Type | G-2 | G-2 | G-2 | G-2 | G-2 | G-7 | G-2 | G-2 | G-2 |
| Parts | 6 | 20 | 2 | 32 | 10 | 10 | 6 | 6 | 6 |
| Content of ethylenically unsaturated | 0.36 | 1.2 | 0.12 | 1.92 | 0.6 | 0.6 | 0.36 | 0.36 | 0.36 |

TABLE 5-continued

|  | Example 17 | Example 18 | Comparative Example 3 | Comparative Example 4 | Example 19 | Comparative Example 5 | Example 20 | Example 21 | Example 22 |
|---|---|---|---|---|---|---|---|---|---|
| carboxylic acid in composition (% by weight) |  |  |  |  |  |  |  |  |  |
| Type of metal compound | — | — | — | — | — | — | — | ZnO | NaOH |
| Molar ratio of metal compound to unsaturated carboxylic acid | — | — | — | — | — | — | 0 | 1.0 | 0.7 |
| Impact strength (kg · cm/cm) | 41 | 27 | 36 | 14 | 40 | 14 | 41 | 38 | 39 |
| Surface gloss (%) | 42 | 13 | 65 | 13 | 25 | 27 | 42 | 22 | 24 |
| Surface appearance | o | o | x | x | o | o | o | o | o |

The following matters are seen from Table 5.

When the amount of the component (A) is more than 97% by weight, in other words, the amount of the component (B) is less than 3% by weight, the impact resistance is sufficient but the matte effect is insufficient, and gloss is observed (Example 17 and Comparative Example 3). When the amount of the component (A) is less than 70% by weight, in other words, the amount of the component (B) is more than 30% by weight, the impact resistance is unsatisfactory (Example 18 and Comparative Example 4).

Comparative Example 5 is a case using a high polymer modifier for matting which contains no rubber component and accordingly is outside the range of this invention. Meanwhile, Example 19 is a case using a high polymer modifier for matting of this invention but using the same rubber content and methacrylic acid content in thermoplastic resin composition as in Comparative Example 5. The impact resistance in Example 19 is superior to that in Comparative Example 5.

When a metal compound is added, the resulting composition gives a molded article of good matte effect and good surface appearance (Examples 21 and 22).

EXAMPLES 23-25 AND COMPARATIVE EXAMPLES 6-7

The preparation and property measurement of each resin composition were made in the same manners as in Examples 1-16. The results are shown in Table 6. These Examples are cases for showing an effect of the content of rubbery polymer in high polymer modifier of matting [the component (B)], on properties of molded article. When the content is less than 10% by weight, the impact resistance is unsatisfactory (Comparative Example 6) and, when the content is more than 60% by weight, the surface appearance is unsatisfactory (Comparative Example 7).

TABLE 6

|  | Example 23 | Example 24 | Example 25 | Comparative Example 6 | Comparative Example 7 |
|---|---|---|---|---|---|
| (A) Rubber-modified alkenyl aromatic thermoplastic resin (parts) |  |  |  |  |  |
| ABS Resin-1 | 80 | 80 | 80 | 80 | 80 |
| As Resin | 10 | 10 | 10 | 10 | 10 |
| (B) High polymer modifier for matting |  |  |  |  |  |
| Type | G-18 | G-19 | G-20 | G-21 | G-22 |
| Parts | 10 | 10 | 10 | 10 | 10 |
| Contents of ethylenically unsaturated | 6 | 6 | 6 | 6 | 6 |

TABLE 6-continued

|  | Example 23 | Example 24 | Example 25 | Comparative Example 6 | Comparative Example 7 |
|---|---|---|---|---|---|
| carboxylic acid in high polymer modifier for matting (graft polymer) (% by weight) |  |  |  |  |  |
| Content of rubbery polymer in high polymer modifier for matting (graft polymer) (% by weight) | 15 | 30 | 50 | 5 | 65 |
| Impact strength (kg · cm/cm) | 28 | 35 | 40 | 15 | 42 |
| Surface gloss (%) | 24 | 25 | 23 | 24 | 25 |
| Surface appearance | o | o | o | o | x |

COMPARATIVE EXAMPLES 8 AND 9

Comparative Example 8 is a case where styrene, acrylonitrile and methacrylic acid were graft-polymerized onto a polybutadiene rubber so as to give the same monomer composition as in Example 2. Comparative Example 9 is a case where zinc oxide as a metal compound was added to the composition in Comparative Example 8. The results are shown in Table 7.

The monomer composition in Comparative Example 8 is the same as that in Example 2. But the resin composition in Comparative Example 8 contains only a graft copolymer while the resin composition in Example 2 is a three-component blend of an ABS resin, an AS resin and a graft copolymer obtained by graft-polymerizing styrene, acrylonitrile and methacrylic acid onto a polybutadiene rubber.

The molded article in Comparative Example 8 has low surface gloss but poor impact resistance and poor surface appearance.

The addition of a metal compound to the composition of Comparative Example 8 as in Comparative Example 9 does not give properties close to those in Example 2.

COMPARATIVE EXAMPLES 10 AND 11

Comparative Example 10 is a case using a three-component blend of an ABS resin, an AS resin and a styrene-acrylonitrile-methacrylic acid copolymer so as to give the same monomer composition as in Example 2 Comparative Example 11 is a case where zinc oxide as a metal compound was added to the composition in Comparative Example 10. The results are shown in Table 7.

Example 2 and Comparative Example 10 have the same monomer composition. The resin composition in Comparative Example 10 is a three-component blend of an ABS resin, an AS resin and a styrene-acrylonitrile-methacrylic acid copolymer while the resin composition in Example 2 is a three-component blend of an ABS resin, an AS resin and a graft copolymer obtained by graft-copolymerizing styrene, acrylonitrile and methacrylic acid onto a polybutadiene rubber.

The molded article in Comparative Example 10 has low surface gloss and good surface appearance but unsatisfactory (low) impact resistance.

The addition of a metal compound to the resin composition of Comparative Example 10 as in Comparative Example 11 does not give properties close to those in Example 2.

TABLE 7

|  | Comparative Examples | | | |
|---|---|---|---|---|
|  | 8 | 9 | 10 | 11 |
| ABSM resin (parts) | 100 | 100 | — | — |
| Butadiene rubber | 20 | 20 | — | — |
| Styrene | 54.75 | 54.75 | — | — |
| Acrylonitrile | 24.65 | 24.65 | — | — |
| Methacrylic acid | 0.6 | 0.6 | — | — |
| ABS resin-3 (parts) | — | — | 77 | 77 |
| AS resin (parts) | — | — | 13 | 13 |
| ASM resin (parts) | — | — | 10 | 10 |
| Styrene | — | — | 70.5 | 70.5 |
| Acrylonitrile | — | — | 23.5 | 23.5 |
| Methacrylic acid | — | — | 6 | 6 |
| Metal compound | — | ZnO | — | ZnO |
| Mole ratio of metal compound to unsaturated carboxylic acid | — | 1.0 | — | 1.0 |
| Impact resistance (kg · cm/cm) | 24 | 23 | 26 | 25 |
| Surface gloss (%) | 40 | 27 | 31 | 21 |
| Surface appearance | x | x | o | o |

Note:
ABSM resin is a graft copolymer obtained by graft-copolymerizing styrene, acrylonitrile and methacrylic acid onto a polybutadiene rubber. ASM resin is a three-component copolymer of styrene, acrylonitrile and methacrylic acid.

What is claimed is:

1. A matte thermoplastic resin composition consisting essentially of:
   (A) 70–97% by weight of a rubber-modified alkenyl aromatic thermoplastic resin and
   (B) 30–3% by weight of a graft copolymer as a high polymer modifier for matting, obtained by polymerizing an ethylenically unsaturated carboxylic acid and at least one monomer selected from the group consisting of an alkenyl aromatic compound, an alkenyl cyanide compound and other copolymerizable alkenyl monomer in the presence of a rubbery polymer latex, wherein the content of the ethylenically unsaturated carboxylic acid component in the high polymer modifier (B) is 1–30% by weight and the content of the rubbery polymer in the high polymer modifier (B) is 10–40% by weight, said rubbery polymer latex containing at least one dispersant selected from the group consisting of salts of aliphatic alcohol sulfates, alkylarylsulfonic acid salts, sodium dialkylsulfosuccinates, alkyl phosphonates, sodium polyoxyethylene alkyl ether sulfates, naphthalenesulfonic acid-formaline condensate, polyoxyethylene lauryl ether, polyoxyethylene nonylphenyl ether, laurylamine acetate and stearyltrimethylammonium chloride.

2. The composition according to claim 1, wherein the rubbery polymer latex gives a percentage coagulation of 20% by weight or less based on the total solids of the latex when 15% by weight, based on the total solids, of methacrylic acid is added to the latex.

3. The composition according to claim 1, wherein the rubber-modified alkenyl aromatic thermoplastic resin (A) is obtained by copolymerizing an alkenyl aromatic compound and a copolymerizable monomer in the presence of a rubbery polymer.

4. The composition according to claim 3, wherein the rubbery polymer is at least one member selected from the group consisting of a polybutadiene, a styrenebutadiene copolymer, an acrylic copolymer, an ethylenepropylene copolymer, a chlorinated polyethylene and a polyurethane.

5. The composition according to claim 1, wherein the content of the rubbery polymer in the component (A) is 5–40% by weight.

6. The composition according to claim 3, wherein the alkenyl aromatic monomer is styrene, α-methylstyrene or bromostyrene.

7. The composition according to claim 3, wherein the copolymerizable monomer is at least one member selected from the group consisting of acrylonitrile, methacrylonitrile, methyl methacrylate, N-phenylmaleimide and N-cyclohexylmaleimide.

8. The composition according to claim 1, wherein the rubber-modified alkenyl aromatic thermoplastic resin is at least one member selected from the group consisting of an acrylonitrile-butadiene-styrene resin (ABS resin), an acrylonitrile-ethylene-propylene-styrene resin (AES resin), a methyl methacrylate-butadiene-styrene resin (MBS resin), an acrylonitrile-butadiene-methyl methacrylate-styrene resin, an acrylonitrile-n-butyl acrylates-tyrene resin (AAS resin) and a rubber-modified polystyrene.

9. The composition according to claim 1, wherein, in the component (B), the rubbery polymer of the rubbery polymer latex is at least one member selected from the group consisting of a polybutadiene, a styrene-butadiene copolymer, an acrylic copolymer, an ethylene-propylene copolymer, a chlorinated polyethylene and a polyurethane.

10. The composition according to claim 1, wherein, in the component (B), the amount of the rubbery polymer is 20–50% by weight.

11. The composition according to claim 1, wherein, in the component (B), the ethylenically unsaturated carboxylic acid is at least one member selected from the group consisting of acrylic acid, methacrylic acid, itaconic acid, maleic acid and fumaric acid.

12. The composition according to claim 1, wherein, in the component (B), the amount of the ethylenically unsaturated carboxylic acid in the graft copolymer is 3–10% by weight.

13. The composition according to claim 1, wherein the alkenyl aromatic compound is at least one member selected from the group consisting of styrene, α-methylstyrene and bromostyrene.

14. The composition according to claim 1, wherein the alkenyl cyanide compound is at least one member selected from the group consisting of acrylonitrile and methacrylonitrile.

15. The composition according to claim 1, wherein, in the component (B), the ratio of the alkenyl aromatic compound/the alkenyl cyanide compound/other copolymerizable alkenyl monomer is 50–90/10–40/0–40 by weight.

16. A composition according to claim 1, wherein, in the component (B), the proportion of the amounts of the monomers directly grafted to the rubbery polymer, to the amount of the rubbery polymer, i.e. the degree of grafting, is 10-150% by weight.

17. The composition according to claim 1, wherein, in the component (B), the methyl ethyl ketone-soluble portion of the graft copolymer has an intrinsic viscosity of 0.25-1.0 dl/g at 30° C.

18. The composition according to claim 1, wherein the mixing ratio of the component (A)/the component (B) is 80-95/20-5 by weight.

19. The composition according to claim 1, wherein the total content of the rubbery polymers in the component (A) and the component (B) is 10-30% by weight based on weight of the composition

* * * * *